US011561289B2

(12) United States Patent
Zhou et al.

(10) Patent No.: US 11,561,289 B2
(45) Date of Patent: Jan. 24, 2023

(54) SCANNING LIDAR SYSTEM WITH A WEDGE PRISM

(71) Applicant: BEIJING VOYAGER TECHNOLOGY CO., LTD., Beijing (CN)

(72) Inventors: Qin Zhou, Mountain View, CA (US); Youmin Wang, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 354 days.

(21) Appl. No.: 17/033,632

(22) Filed: Sep. 25, 2020

(65) Prior Publication Data

US 2022/0099805 A1 Mar. 31, 2022

(51) Int. Cl.
*G01S 7/481* (2006.01)
*G01S 17/10* (2020.01)
*G02B 26/08* (2006.01)
*G01S 17/931* (2020.01)
*G02B 5/04* (2006.01)
*G01S 17/894* (2020.01)

(52) U.S. Cl.
CPC ............ *G01S 7/4817* (2013.01); *G01S 17/10* (2013.01); *G01S 17/894* (2020.01); *G01S 17/931* (2020.01); *G02B 5/04* (2013.01); *G02B 26/0816* (2013.01)

(58) Field of Classification Search
CPC .... G01S 7/4817; G01S 17/931; G01S 17/894; G01S 17/10; G02B 5/04; G02B 6/0816
See application file for complete search history.

(56) References Cited

U.S. PATENT DOCUMENTS

| 5,006,721 A * | 4/1991 | Cameron | G01S 7/4817 |
| | | | 250/559.22 |
| 2015/0247953 A1* | 9/2015 | O'Brien | G01W 1/10 |
| | | | 416/41 |
| 2018/0188371 A1* | 7/2018 | Bao | G01S 17/10 |
| 2019/0324122 A1* | 10/2019 | Buehring | G01S 7/4815 |
| 2020/0284883 A1* | 9/2020 | Ferreira | G01S 17/10 |

FOREIGN PATENT DOCUMENTS

GB 2572981 A * 10/2019 ............. G01S 17/89

* cited by examiner

*Primary Examiner* — Mary Ellen Bowman
(74) *Attorney, Agent, or Firm* — Bayes PLLC

(57) ABSTRACT

Embodiments of the disclosure provide systems and methods for an optical sensing system steering optical beams with a wedge prism. An exemplary system may include a scanner configured to steer an emitted optical beam towards an object. The system may further include a wedge prism configured to receive an optical beam returned from the object and refract the returned optical beam towards the scanner. The scanner is further configured to steer the refracted optical beam to form a receiving optical beam in a direction non-parallel to the emitted optical beam.

20 Claims, 7 Drawing Sheets

SCANNING LIDAR SYSTEM WITH A WEDGE PRISM

TECHNICAL FIELD

The present disclosure relates to optical sensing systems such as a light detection and ranging (LiDAR) system, and more particularly to, scanning LiDAR systems using a wedge prism for steering optical beams.

BACKGROUND

Optical sensing systems such as LiDAR systems have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor such as a photodetector or a photodetector array. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

A LiDAR system typically includes a transmitter to emit a laser beam to a direction (e.g., towards an object). For example, a laser source of the transmitter emits the laser beam to a scanner. The scanner rotates around a rotation axis and steers the emitted laser beam towards the object. In a fully co-axial LiDAR, the laser beam is backscattered by the object and returned to the scanner. The scanner steers the returned laser beam to a LiDAR receiver through a beam splitter.

For example, FIG. 1 illustrates an exemplary beam splitter for steering laser beams to a receiver of the LiDAR system. As shown in FIG. 1, a laser emitter 101 of the LiDAR system emits a laser beam 102 (in dashed lines) towards a scanner 105 of the LiDAR system through a beam splitter 103. Because laser beam 102 and beam splitter 103 may be both polarized, laser beam 102 does not lose energy when going through beam splitter 103. Laser beam 102 is received and steered by scanner 105 towards an object 107, and becomes a laser beam 106 (in dashed lines). Object 107 returns a laser beam 108 to scanner 105 which reflects laser beam 108 to form a laser beam 110 towards beam splitter 103. Assuming scanner 105 stays substantially at the same angle during the time the laser beam travels to object 107 and returns to scanner 105, laser beam 110 is in a substantially same light path as laser beam 102 except in an opposite direction. In order for laser beam 110 not to return directly to laser emitter 101 but to receiver 113 located not on the light path, laser beam 110 may be redirected by beam splitter 103 to form a new laser beam 112 towards a receiver 113 of the LiDAR system. Because laser beam 110 is not a polarized laser beam, part of laser beam 110 is not redirected towards receiver 113 but goes through beam splitter 103 to form a laser beam 114 towards laser emitter 101. As a result, some (approximately 50%) energy may be lost due to beam splitting. The limited light collection capability of beam splitter 103 may impact an overall performance of the LiDAR system.

Systems and methods disclosed herein provide an improved design for scanning LiDAR systems by removing the beam splitter and thus reducing the energy loss.

SUMMARY

Embodiments of the disclosure provide a scanning system for an optical sensing system steering optical beams with a wedge prism. An exemplary scanning system may include a scanner configured to steer an emitted optical beam towards an object. The system may further include a wedge prism configured to receive an optical beam returned from the object and refract the returned optical beam towards the scanner. The scanner is further configured to steer the refracted optical beam to form a receiving optical beam in a direction non-parallel to the emitted optical beam.

Embodiments of the disclosure also provide a scanning method for an optical sensing system steering optical beams with a wedge prism. An exemplary method may include steering an emitted optical beam, by a scanner, towards an object. The method may further include receiving an optical beam returned from the object and refracting the returned optical beam towards the scanner by a wedge prism. The method may also include steering the refracted optical beam, by the scanner, to form a receiving optical beam in a direction non-parallel to the emitted optical beam. The method may additionally include detecting the receiving optical beam by a receiver.

Embodiments of the disclosure further provide an optical sensing system. An exemplary optical sensing system may include an emitter configured to emit an optical beam. The optical sensing system may further include a scanning system. The scanning system may include a scanner configured to steer the emitted optical beam towards an object. The scanning system may further include a wedge prism configured to receive an optical beam returned from the object and refract the returned optical beam towards the scanner. The scanner is further configured to steer the refracted optical beam to form a receiving optical beam in a direction non-parallel to the emitted optical beam. The optical sensing system may also include a receiver configured to detect the receiving optical beam steered by the scanner.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

An optical sensing system may be used to scan objects, and the detecting result (e.g., point cloud data) can be used for advanced navigation technologies, such as to aid autonomous driving or to generate high-definition maps. For example, the optical sensing system may include a transmitter configured to emit optical beams (e.g., laser beams) steered to scan an object and a receiver configured to receive/detect optical beams reflected by the object. The detected optical beams may be processed to obtain detecting results such as point cloud data.

Embodiments of the present disclosure provide systems and methods for the optical sensing system (e.g., a LiDAR system). The scanning system may include a wedge prism. In some embodiments, the transmitter of the optical sensing system may include an emitter, configured to emit the optical beams. The transmitter may also include a scanner, configured to rotate around a rotation axis and steer the optical beams to scan the object in a field of view (FOV). For example, outgoing optical beams of the scanner may transmit along a plurality of vertical viewing angles within a scanning range. In some embodiments, the wedge prism is placed between the object and the scanner and configured to receive the optical beams returned from the object and refract them towards the scanner. The scanner is further configured to steer the refracted optical beams to form optical beams toward the receiver of the optical sensing system.

By using the wedge prism to refract the optical beams returned from the objects toward to the scanner, the scanner may form optical beams in a direction non-parallel to the emitted optical beams from the emitter. Therefore, the receiver may receive the optical beams without using a beam splitter (e.g., beam splitter 103 in FIG. 1). Instead, the energy loss due to the use of the beam splitter may be avoided. This can significantly increase the accuracy and performance of the optical sensing system.

Figure 2:
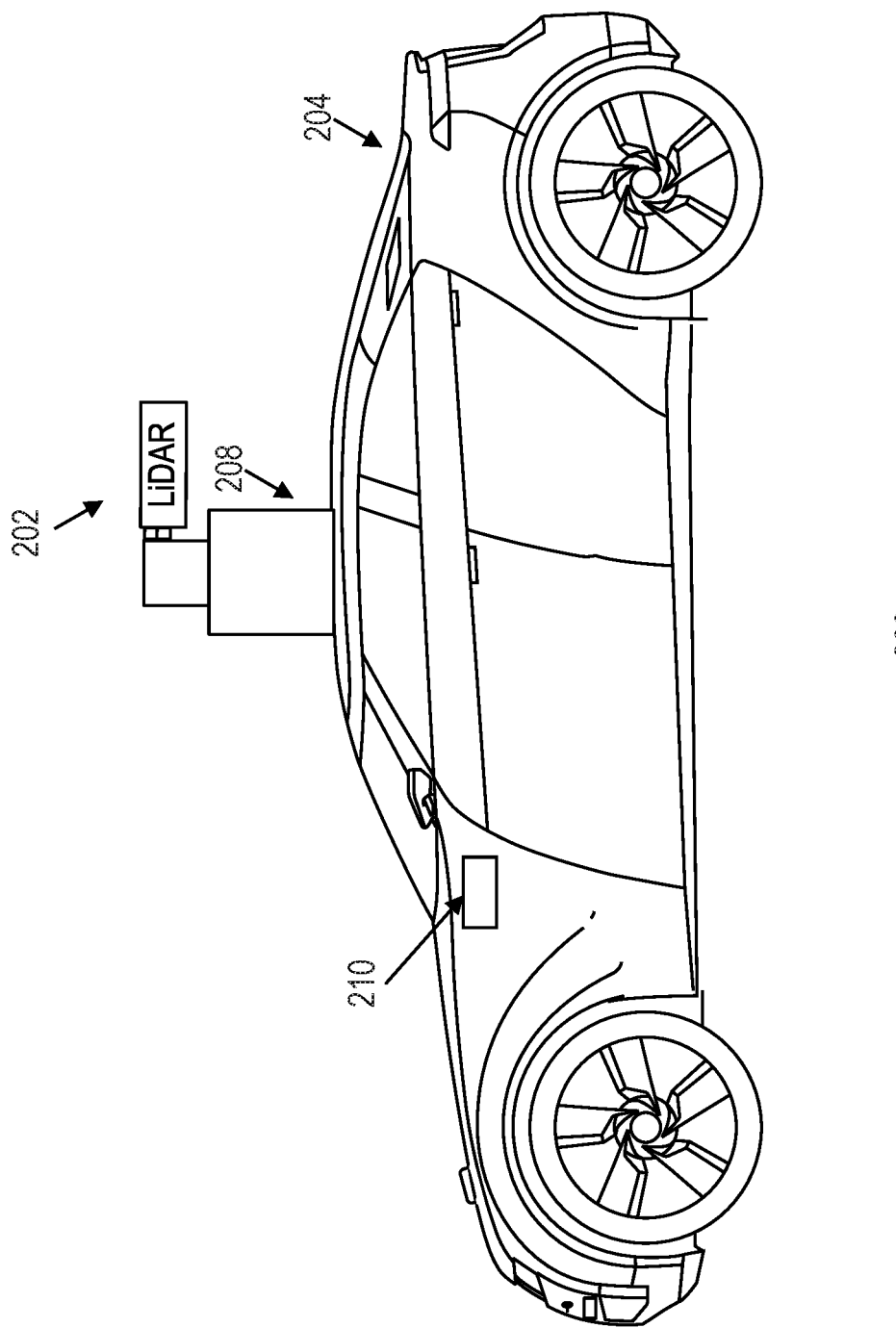
FIG. 2 illustrates a schematic diagram of an exemplary vehicle equipped with a LiDAR system, according to embodiments of the disclosure.

FIG. 2 illustrates a schematic diagram of an exemplary vehicle 200 equipped with an optical sensing system, e.g., a LiDAR system 202, according to embodiments of the disclosure. Consistent with some embodiments, vehicle 200 may be a survey vehicle configured for acquiring data for constructing a high-definition map or 3-D buildings and city modeling. Vehicle 100 may also be an autonomous driving vehicle.

As illustrated in FIG. 2, vehicle 200 may be equipped with LiDAR system 202 mounted to a body 204 via a mounting structure 208. Mounting structure 208 may be an electro-mechanical device installed or otherwise attached to body 204 of vehicle 200. In some embodiments of the present disclosure, mounting structure 208 may use screws, adhesives, or another mounting mechanism. Vehicle 200 may be additionally equipped with a sensor 210 inside or outside body 204 using any suitable mounting mechanisms. Sensor 210 may include sensors used in a navigation unit, such as a Global Positioning System (GPS) receiver and one or more Inertial Measurement Unit (IMU) sensors. It is contemplated that the manners in which LiDAR system 202 or sensor 210 can be equipped on vehicle 200 are not limited by the example shown in FIG. 2 and may be modified depending on the types of LiDAR system 202 and sensor 210 and/or vehicle 200 to achieve desirable 3D sensing performance.

Consistent with some embodiments, LiDAR system 202 and sensor 210 may be configured to capture data as vehicle 200 moves along a trajectory. For example, a transmitter of LiDAR system 202 may be configured to scan the surrounding environment. LiDAR system 202 measures distance to a target by illuminating the target with pulsed laser beam and measuring the reflected pulses with a receiver. The laser beam used for LiDAR system 202 may be ultraviolet, visible, or near infrared. In some embodiments of the present disclosure, LiDAR system 202 may capture point clouds including depth information of the objects in the surrounding environment. As vehicle 200 moves along the trajectory, LiDAR system 202 may continuously capture data.

Figure 3:
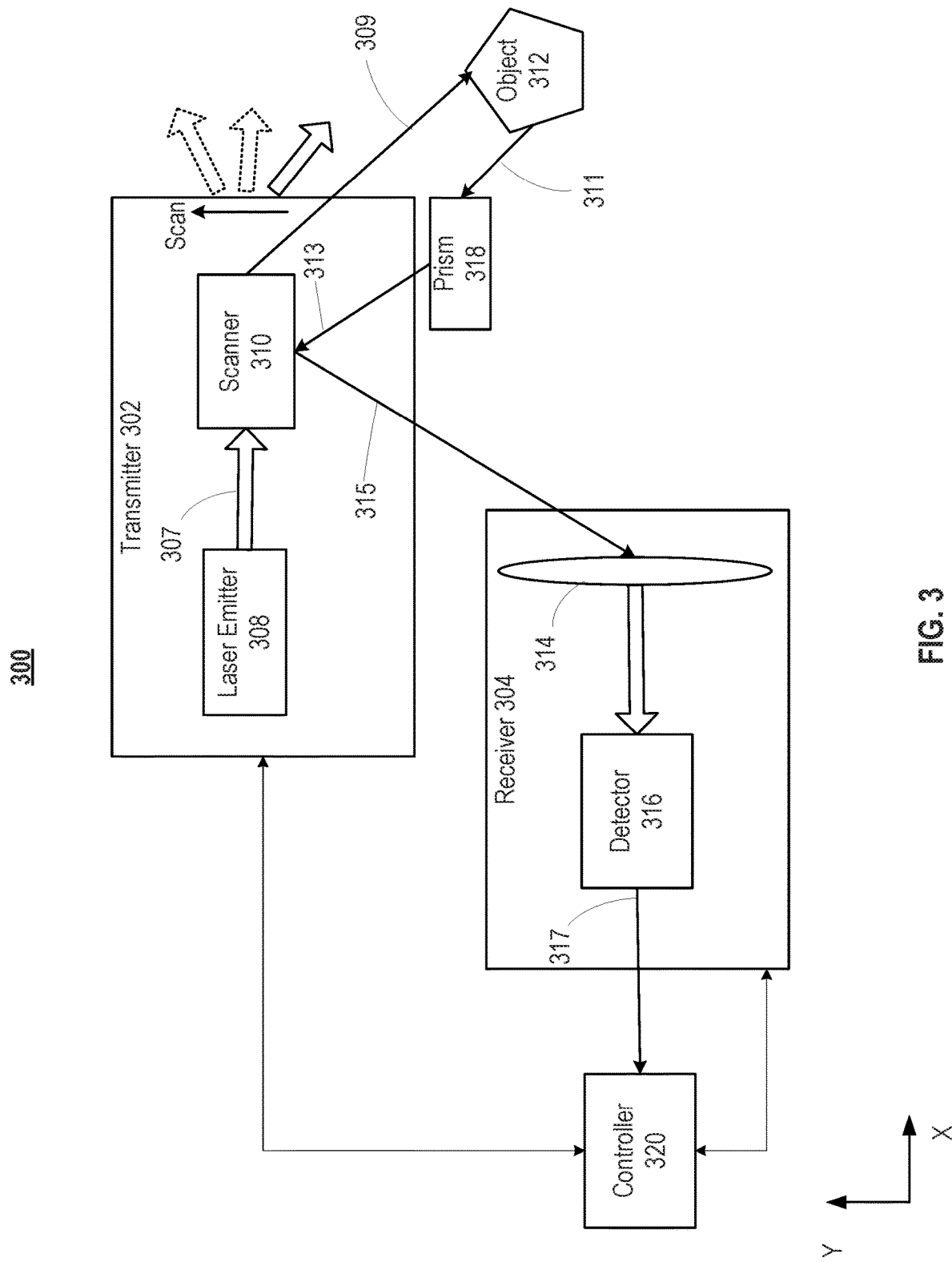
FIG. 3 illustrates a block diagram of an exemplary LiDAR system, according to embodiments of the disclosure.

FIG. 3 illustrates a block diagram of an exemplary LiDAR system 300, according to embodiments of the disclosure. LiDAR system 300 may include a transmitter 302, a receiver 304, and a controller 306. Transmitter 302 may emit laser beams along multiple directions. Transmitter 302 may include one or more laser sources (e.g., a laser emitter 308) and a scanner 310.

In some embodiments, transmitter 302 can sequentially emit a stream of pulsed laser beams in different directions (e.g., scanning angles) within its scanning range as it moves (e.g., rotates, swings, etc.), as illustrated in FIG. 3. Laser emitter 308 may be configured to emit a laser beam 307 (also referred to as a "incident laser beam" with respect to scanner 310) in a respective incident direction to scanner 310. In some embodiments, laser emitter 308 may be disposed within scanner 310. In some embodiments of the present disclosure, laser emitter 308 may generate a pulsed laser beam in the ultraviolet, visible, or near infrared wavelength range.

In some embodiments of the present disclosure, laser emitter 308 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of laser beam 307 provided by a PLD may be smaller than 1,100 nm, such as 405 nm, between 445 nm and 465 nm, between 510 nm and 525 nm, 532 nm, 635 nm, between 650 nm and 660 nm, 670 nm, 760 nm, 785 nm, 808 nm, 848 nm, or 905 nm. It is understood that any suitable laser source may be used as laser emitter 308 for emitting laser beam 307.

Scanner 310 may include a scanning mirror (not shown) that is configured to rotate around a rotation axis (e.g., along Z-axis, not shown), thus steering laser beams in different directions within the scanning range. For example, scanner 310 may be configured to steer a laser beam 309 (also referred to as "outgoing laser beam" with respect to scanner 310) in a direction to scan an object 312. In some embodiments, scanner 310 may also include other optical components (e.g., lenses) that can collimate pulsed laser light into a narrow laser beam to increase the scan resolution. In some embodiments, object 312 may be made of a wide range of materials including, for example, non-metallic objects, rocks, rain, chemical compounds, aerosols, clouds and even single molecules. Upon contact, laser beam 309 can be reflected by object 312 via backscattering, such as Rayleigh scattering, Mie scattering, Raman scattering, and fluorescence.

Object 312 may backscatter laser beam 309 to form a returned laser beam towards transmitter 302. In some embodiments, a wedge prism 318 may be placed between object 312 and scanner 310 and configured to receive laser beam 311 returned from object 312. In some embodiments, scanner 310 and wedge prism 318 may be integrated into a scanning system. In some embodiments, returned laser beam 311 may be parallel to laser beam 309, but in an opposite direction from laser beam 309. In some embodiments, wedge prism 318 may be configured to refract laser beam 311 to a direction non-parallel to laser beam 309. For example, wedge prism 318 may be an optical prism with triangular bases and rectangular sides. Laser beam 311 may be received by wedge prism 318 from a first rectangular side and be refracted to a different direction. The refracted laser beam may reach a second rectangular side of wedge prism 318 and be refracted to form an outgoing laser beam 313 with respect to wedge prism 318. Due to the fraction, laser beam 313 is no longer parallel to laser beam 309. In some embodiments, wedge prism 318 may be made of glass, plastic, fluorite, etc. It is contemplated that wedge prism 318 can be in any other suitable shapes or materials to refract retuned laser beam 311 towards scanner 310. In some embodiments, scanner 310 may receive refracted laser beam 313 and steer it to receiver 304, which forms an outgoing laser beam 315 of scanner 310.

Receiver 304 may be configured to collect laser beam 315 reflected by scanner 310 and output electrical signals indicating the intensity of laser beam 315. As illustrated in FIG. 3, receiver 304 may include a lens 314 and a detector 316. Lens 314 may be configured to collect light (e.g., laser beam 315) reflected by scanner 310 and converge it to a light spot before being detected by detector 316.

Detector 316 may be configured to detect laser beam 315 reflected by scanner 310 and converged by lens 314. In some embodiments, detector 316 may convert a laser light (e.g., laser beam 315) collected by lens 314 into an electrical signal 317 (e.g., a current or a voltage signal). Electrical signal 317 may be generated when photons are absorbed in a photodiode included in detector 316. In some embodiments of the present disclosure, detector 316 may include a PIN detector, a PIN detector array, an avalanche photodiode (APD) detector, a APD detector array, a single photon avalanche diode (SPAD) detector, a SPAD detector array, a silicon photomultiplier (SiPM/MPCC) detector, a SiP/MPCC detector array, or the like.

In some embodiments, LiDAR system 300 may further include one or more controllers, such as a controller 320. Controller 320 may control the operation of transmitter 302 and/or receiver 304 to perform detection/sensing operations. For example, controller 320 may control the scanning of transmitter 302 (e.g., the rotation of scanner 310). Controller 320 may also be configured to process the optical beams received accordingly. For example, controller 320 may be configured to merge data of FOVs scanned by laser beams 307 emitted by different laser emitters 308 and generate an FOV with larger scanning range (e.g., a 360-degree FOV). Controller 320 may also be configured to obtain point cloud data based on returned laser beams 309 from the scanned FOVs. It is contemplated that to obtain point cloud data of a merged FOV, controller 320 may either merge the raw data (e.g., the captured light signals returned from the scanned FOVs) and obtain the point cloud data of the merged detecting result, or controller 320 may obtain the point cloud data of each scanned FOV and merge the point cloud data of each scanned FOV.

In some embodiments, controller 320 may include components (not shown) such as a communication interface, a processor, a memory, and a storage for performing various control functions. In some embodiments, controller 320 may have different modules in a single device, such as an integrated circuit (IC) chip (implemented as, for example, an application-specific integrated circuit (ASIC) or a field-programmable gate array (FPGA)), or separate devices with dedicated functions.

In some embodiments, the processor of controller 320 may include any appropriate type of general-purpose or special-purpose microprocessor, digital signal processor, or microcontroller. The memory or storage may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. For example, the memory and/or the storage may be configured to store program(s) that may be executed by the processor to control the operation of scanner 310.

Figure 4:
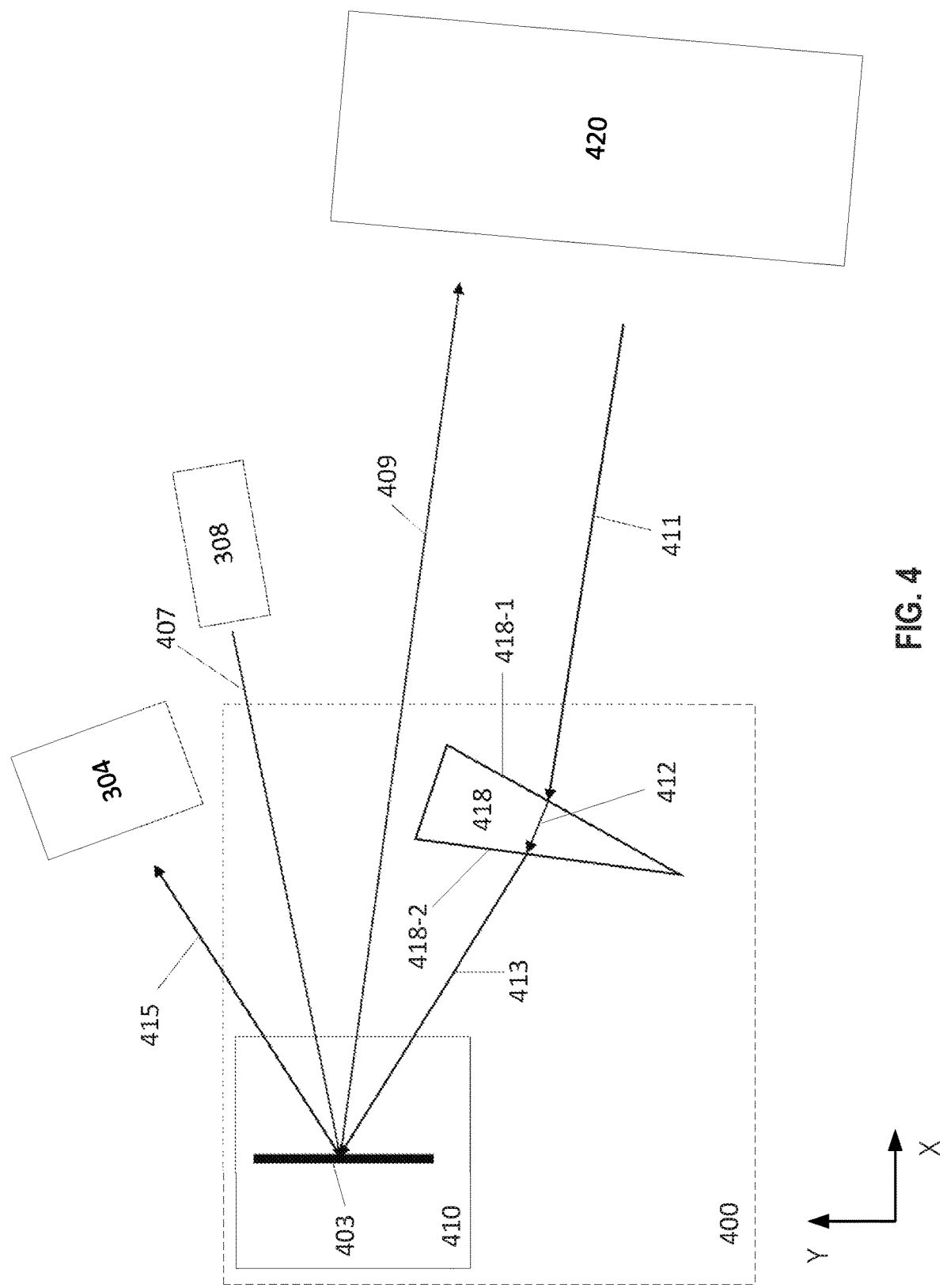
FIG. 4 illustrates a schematic diagram of an exemplary scanning system, according to embodiments of the disclosure.

FIG. 4 illustrates a schematic diagram of an exemplary scanning system 400, according to embodiments of the disclosure. As shown in FIG. 4, scanning system 400 may include a scanner 410 and a wedge prism 418, corresponding to scanner 310 and wedge prism 318 in FIG. 3. It is understood that the relative spatial relationships between or among components shown in FIG. 4 is for illustrative purpose only. Any suitable arrangement according to the principle disclosed herein can be used for arranging components of scanning system 400 according to various embodiments disclosed herein.

As shown in FIG. 4, laser emitter 308 may emit a laser beam 407 towards scanner 410 of scanning system 400. Consistent with the present disclosure, scanner 410 may include a scanning mirror 403 continuously rotating around a rotation axis (not shown) to steer received incident laser beams towards different directions within the FOV. For example, scanning mirror 403 may receive emitted laser beam 407 and steer it to form a laser beam 409 to scan an object 420 within the scanning range of the FOV. Wedge prism 418 may be placed such that not to refract or otherwise interfere with laser beam 409. Object 420 may backscatter laser beam 409 and return a laser beam 411 back to scanning system 400.

Consistent with some embodiments, laser beam 411 may be parallel to laser beam 409, but in an opposite direction from laser beam 409. In some embodiments, returned laser beam 411 may be received by wedge prism 418. For example, as shown in FIG. 4, laser beam 411 is received by a first surface 418-1 of wedge prism 418. Surface 418-1 refracts laser beam 411 to form a refracted laser beam 412 to a first direction different from that of laser beam 411. As shown in FIG. 4, laser beam 412 may be refracted at a second surface 418-2 of wedge prism 418. Wedge prism 418 may form a refracted laser beam 413 to a second direction different from that of laser beam 412, and further different from that of laser beam 411. In some embodiments, because surface 418-1 is not parallel to surface 418-2, laser beam 413 is not parallel to laser beam 411.

In some embodiments, wedge prism 418 may have two triangular bases (e.g., a top base and a bottom base) and rectangular sides (e.g., surfaces 418-1 and 418-2). The two triangular bases are parallel to each other. Each of the rectangular sides is orthogonal to the triangular bases. As a result, incident laser beam 411, refracted laser beam 412, and outgoing laser beam 413 may travel in a same plane (e.g., XOY plane). It is contemplated that wedge prism 318 may have bases in any other suitable shapes than the triangular shape illustrated in FIG. 4. For example, wedge prism 418 can be a hexagonal prism. To steer laser beam 413 to the direction different than laser beam 411, surfaces 418-1 and 418-2 of wedge prism 418 used to refract the laser beams cannot be parallel to each other. In some embodiments, surface 418-1 or surface 418-2 may not be orthogonal to the bases. As a result, incident laser beam 411 and outgoing laser beam 413 may travel in different planes.

Figure 5:
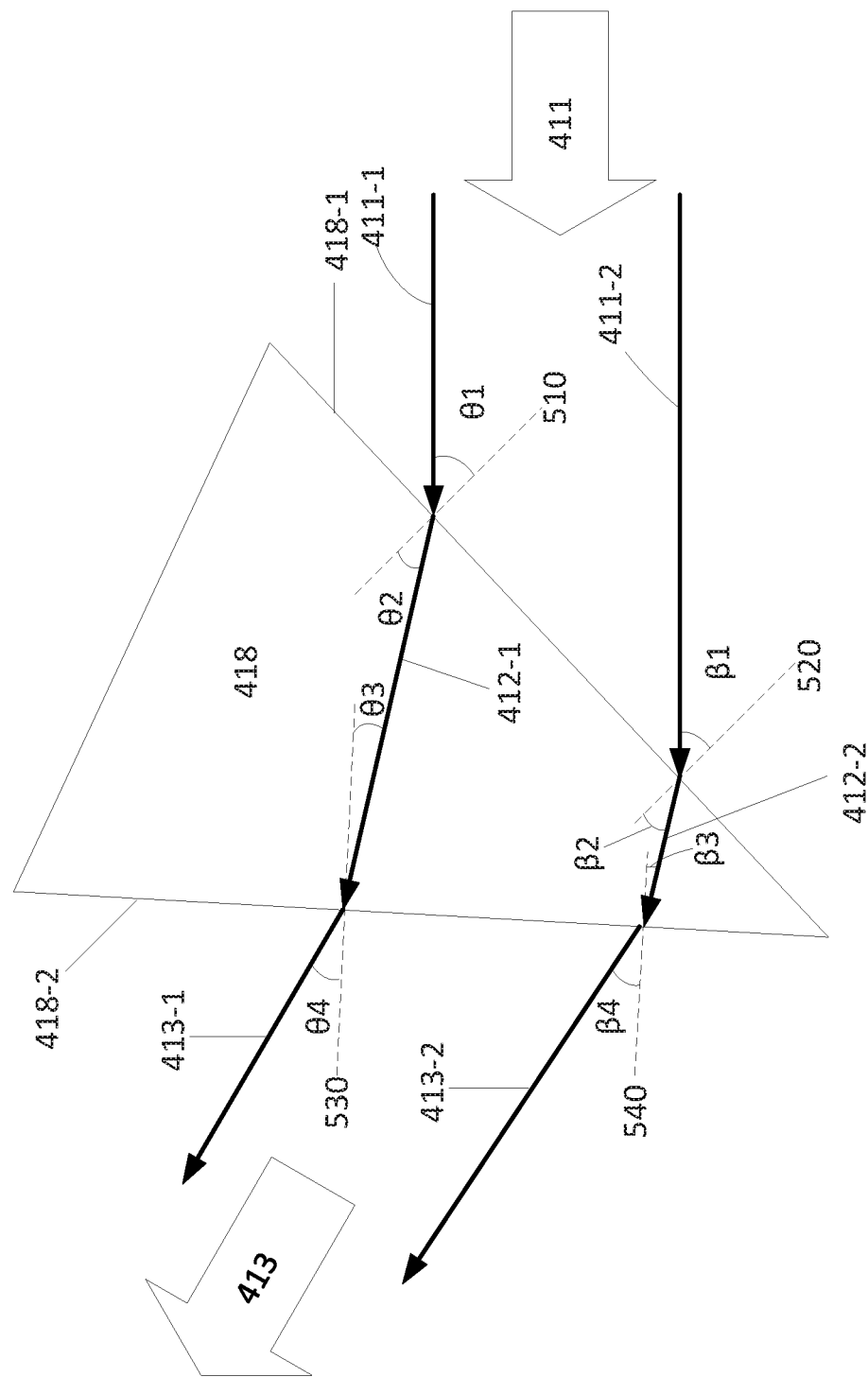
FIG. 5 illustrates a schematic diagram of an exemplary wedge prism refracting parallel light rays, according to embodiments of the disclosure.

In some embodiments, the returned laser beam may include multiple parallel light rays refracted by wedge prism 418. For example, FIG. 5 illustrates a schematic diagram of an exemplary wedge prism 418 refracting parallel light rays, according to embodiments of the disclosure. As shown in FIG. 5, laser beam 411 returned from object 420 (not shown) may include two parallel light rays (e.g., incident rays 311-1 and 311-2) entering wedge prism 418 from surface 418-1. Angle of incidence $\theta 1$ is defined as an angle between incident ray 411-1 and a line 510 (shown as a dashed line) normal to surface 418-1 at a first point of incidence. Similarly, angle of incidence $\beta 1$ is defined as an angle between incident ray 411-2 and a line 520 (shown as a dashed line) normal to surface 418-1 at a second point of incidence. Because incident ray 411-1 is parallel to incident ray 411-2, angle of incidence $\theta 1$ is equal to angle of incidence $\beta 1$.

In some embodiments, surface 418-1 of wedge prism 418 may steer incident ray 411-1 to a direction different than that of incident ray 411-1 to form a refracted ray 412-1 with an angle of refraction $\theta 2$. Surface 418-1 of wedge prism 418 may also steer incident ray 411-2 to a direction different than that of incident ray 411-2 to form a refracted ray 412-2 with an angle of refraction $\beta 2$. Because angle of incidence $\theta 1$ is equal to angle of incidence $\beta 1$, angle of refraction $\theta 2$ is equal to angle of refraction $\beta 2$. As a result, refracted rays 412-1 and 412-2 are parallel light rays traveling in a same direction.

In some embodiments, refracted rays 412-1 and 412-2 may be steered by surface 418-2 of wedge prism 418 to form outgoing rays 413-1 and 413-2, respectively. As shown in FIG. 5, angle of incidence $\theta 3$ is defined as an angle between refracted ray 412-1 and a line 530 (shown as a dashed line) normal to surface 418-2 at a third point of incidence. Similarly, angle of incidence $\beta 3$ is defined as an angle between refracted ray 412-2 and a line 540 (shown as a dashed line) normal to surface 418-2 at a fourth point of incidence. Because refracted ray 412-1 is parallel to refracted ray 412-2, angle of incidence $\theta 3$ is equal to angle of incidence $\beta 3$.

In some embodiments, surface 418-2 of wedge prism 418 may steer refracted ray 412-1 to a direction different than refracted ray 412-1 to form an outgoing ray 413-1 with an angle of refraction $\theta 4$. Surface 418-2 of wedge prism 418 may further steer refracted ray 412-2 to a direction different than refracted ray 412-2 to form an outgoing ray 413-2 with an angle of refraction $\beta 4$. Refracted rays 413-1 and 413-2 may be included in outgoing laser beam 413 of wedge prism 418 as shown in FIG. 4. Because angle of incidence $\theta 3$ is equal to angle of incidence $\beta 3$ as shown in FIG. 5, angle of refraction $\theta 4$ is equal to angle of refraction $\beta 4$. As a result, refracted rays 413-1 and 413-2 are parallel light rays in a same direction towards scanner 410 (not shown in FIG. 5). Therefore, after laser beam 411 consisting of parallel light rays is refracted by wedge prism 418, the resulted laser beam 413 also consist of parallel light rays, although the travel direction of these light rays has changed.

Figure 1:
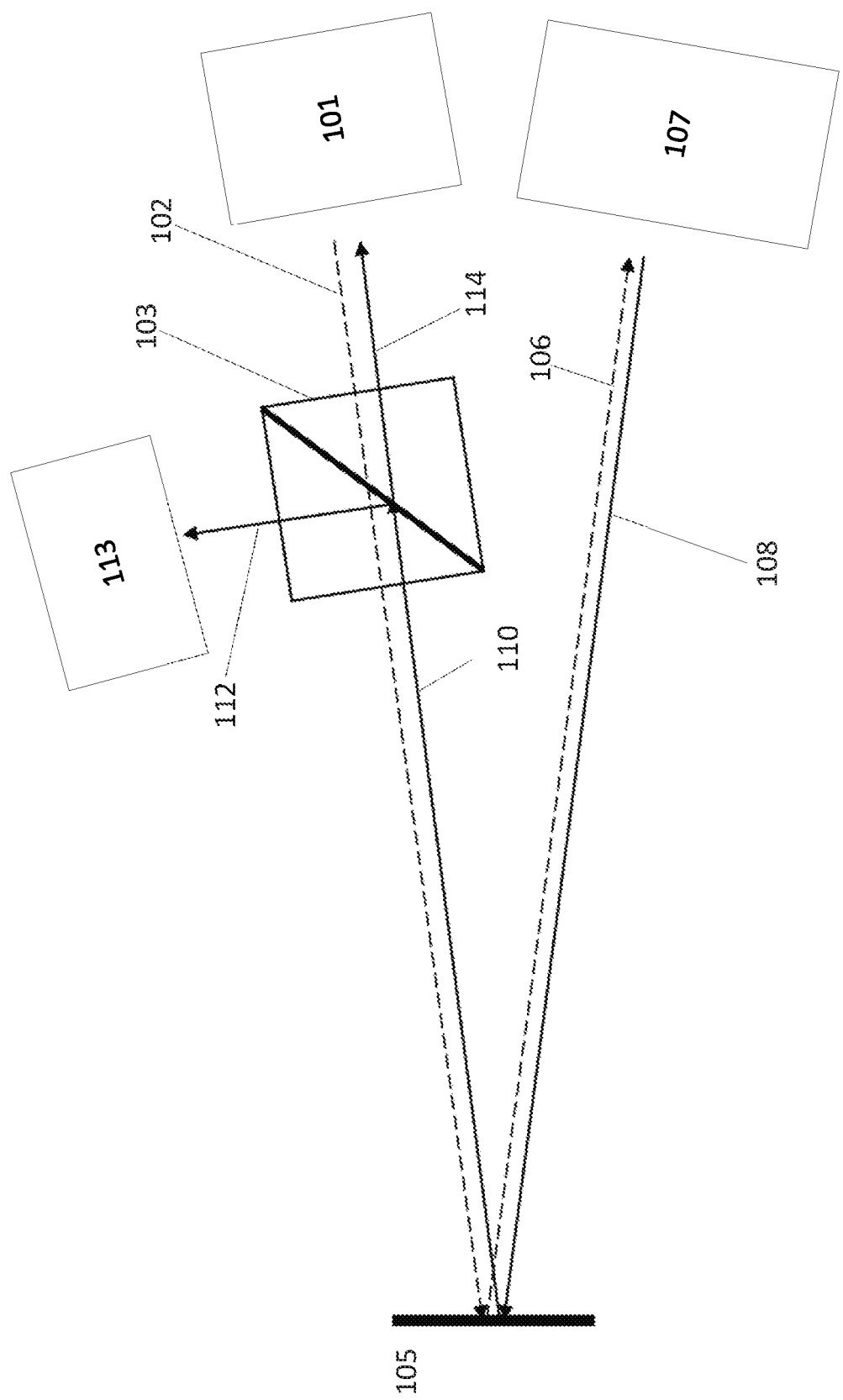
FIG. 1 illustrates an exemplary beam splitter for steering laser beams to a receiver of the LiDAR system.

Returning to FIG. 4, scanning mirror 403 of scanner 410 may be configured to receive laser beam 413 refracted by wedge prism 418. As shown in FIG. 4, because laser beam 413 is non-parallel to laser beam 411 and laser beam 411 is parallel to laser beam 409, laser beam 413 is non-parallel to laser beam 409. In some embodiments, scanning mirror 403 may further be configured to steer refracted laser beam 413 to form an outgoing laser beam 415 relative to scanning mirror 403 (also referred to as a "receiving laser beam") towards receiver 304 for further processing. Because laser beam 413 is non-parallel to laser beam 409, laser beam 415 is not parallel to emitted laser beam 407 emitted by laser emitter 308. Therefore, laser beam 415 may be received directly by receiver 304 without having to go through beam splitter 103 as shown in FIG. 1 to change direction. As a result, beam splitter 103 may be eliminated and receiver 304 may receive substantially 100% of light energy of laser beam 415.

Figure 6:
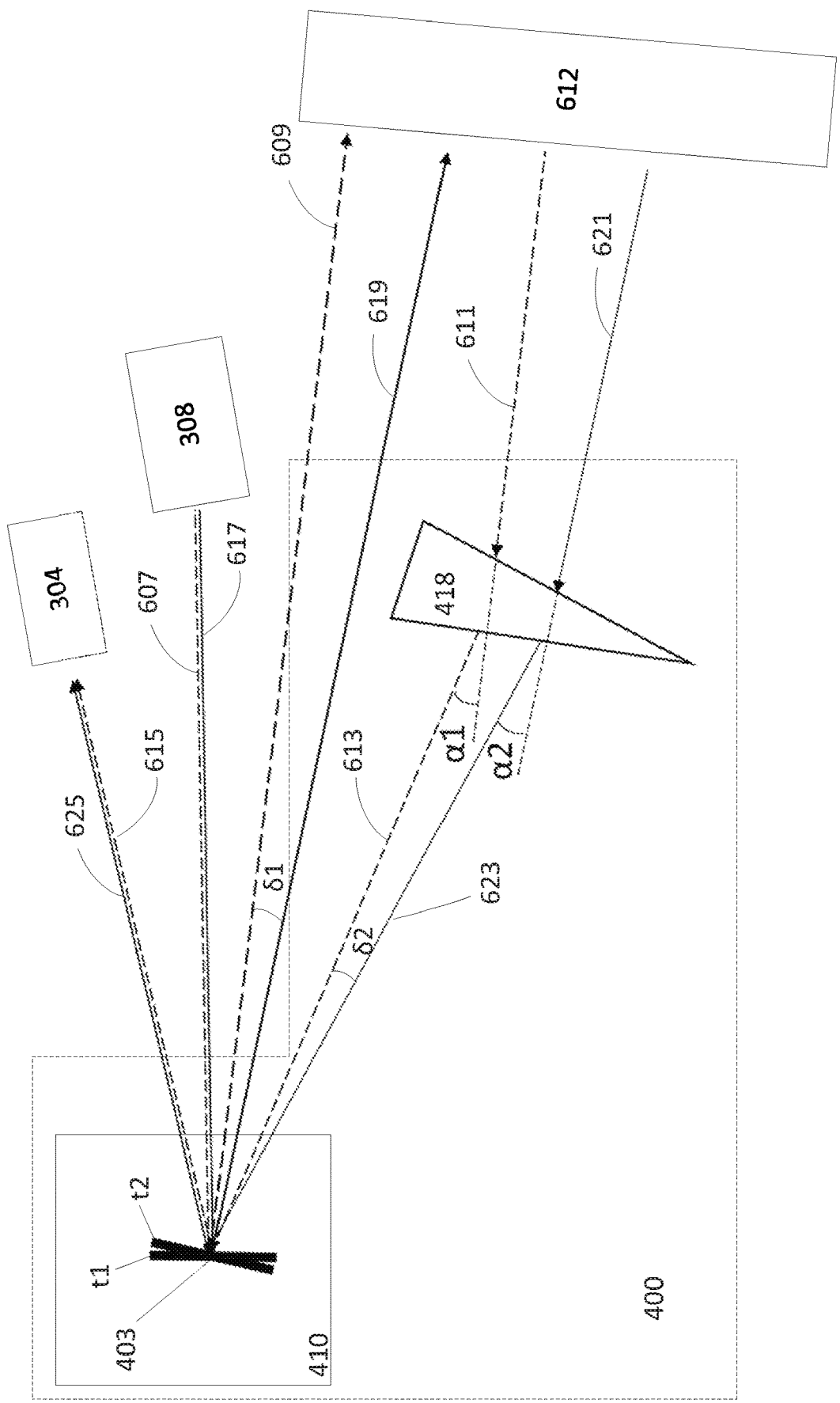
FIG. 6 illustrates a schematic diagram of an exemplary scanning system steering optical beams emitted at different time points, according to embodiments of the disclosure.

FIG. 6 illustrates a schematic diagram of an exemplary scanning system 400 steering optical beams emitted at different time points, according to embodiments of the disclosure. As shown in FIG. 6, laser emitter 308 may sequentially emit two laser beams 607 (in a dashed line) and 617 at a time point t1 and a time point t2 (e.g., t1<t2), respectively. For example, at time point t1, laser emitter 308 emits laser beam 607 towards scanner 410. Scanning mirror 403 may receive laser beam 607 and reflect a laser beam 609 (in a dashed line) at a first scanning angle within the scanning range of scanning system 400. In some embodiments, laser beam 609 may be backscattered by an object 612 to scanning system 400. For example, a laser beam 611 (in a dashed line) returned from object 612 may be received by wedge prism 418 of scanning system 400. In some embodiments, returned laser beam 611 may be parallel to laser beam 609. In some embodiments, wedge prism 418 may refract returned laser beam 611 to form a laser beam 613 (in a dashed line) towards scanner 410. As shown in FIG. 6, an angle $\alpha 1$ between returned laser beam 611 and refracted laser beam 613 indicates how much laser beam 611 is bent by wedge prism 418 in its travel direction. Consistent with some embodiments, scanning mirror 403 of scanner 410 may reflect refracted laser beam 613 to form a laser beam 615 (in a dashed line) towards receiver 304. As shown in FIG. 6, receiver 304 is placed in a light path of laser beam 615.

At time point t2, laser emitter 308 emits laser beam 617 towards scanner 410. Scanning mirror 403 of scanner 410 may rotate to a different rotation angle at time point t2 than that at time point t1. As a result, laser beam 617 may be reflected by scanning mirror 403 at a second scanning angle within a scanning range of scanning system 400. In some embodiments, the range of scanning angles of the LiDAR system may be less than 30 degrees. In other words, an angle $\delta 1$ between laser beams 609 and 619 may be less than 30 degrees.

As shown in FIG. 6, object 612 may backscatter laser beam 619 to form a returned laser beam 621 towards wedge prism 418. In some embodiments, returned laser beam 621 may be parallel to laser beam 619. As shown in FIG. 6, wedge prism 418 may refract returned laser beam 621 to form a laser beam 623 towards scanner 410. An angle $\alpha 2$ between returned laser beam 621 and refracted laser beam 623 indicates how much laser beam 621 is bent by wedge prism 418 in its travel direction. Because the range of the vertical viewing angles of the LiDAR system is small (e.g., less than 30 degrees), the angles the returned laser beams are bent (e.g., laser beams 611 and 621) by wedge prism 418 can be substantially constant. For example, as shown in FIG. 6, angle $\alpha 1$ is substantially equal to angle $\alpha 2$.

Consistent with some embodiments, scanning mirror 403 of scanner 410 may reflect laser beam 623 to form a laser beam 625 towards receiver 304. Because laser beam 609 is parallel to laser beam 611 and laser beam 619 is parallel to laser beam 621, an angle δ2 between refracted laser beams 613 and 623 is substantially equal to angle δ1. As a result, laser beam 625 is in a substantially same direction as laser beam 615. As shown in FIG. 6, receiver 304 may include a relatively small detector placed in a fixed location to receive laser beams returned at different time.

Figure 7:
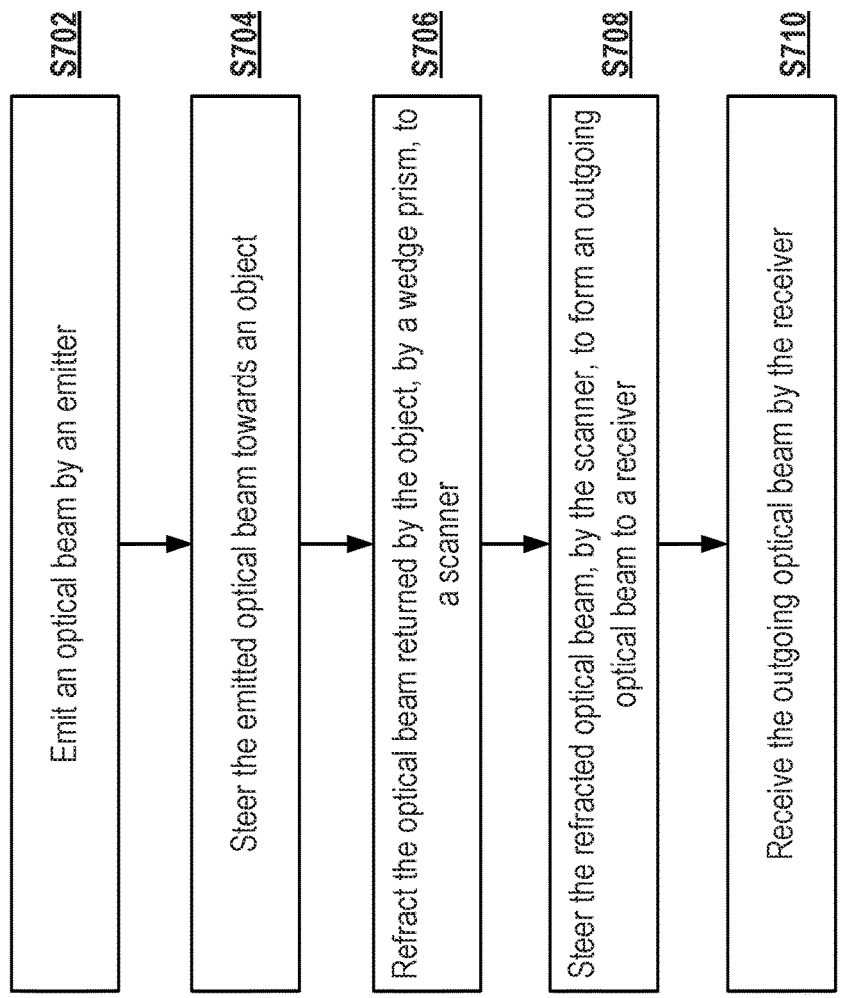
FIG. 7 illustrates a flow chart of an exemplary method for steering optical beams using a scanning system, according to embodiments of the disclosure.

FIG. 7 illustrates a flow chart of an exemplary method 700 for steering optical beams using scanning system 400, according to embodiments of the disclosure. It is understood that the steps shown in method 700 are not exhaustive and that other steps can be performed as well before, after, or between any of the illustrated operations. It is to be appreciated that some of the steps may be optional. Further, some of the steps may be performed simultaneously, or in a different order than shown in FIG. 7.

In step S702, an optical beam (e.g., laser beam 407 in FIG. 4) may be emitted by an emitter (e.g., laser emitter 308 in FIG. 4) to a scanner (e.g., scanner 410 in FIG. 4) of a scanning system (e.g., scanning system 400 in FIG. 4). For example, the emitted optical beam may be an incident optical beam to the scanner. The scanner may include a scanning mirror (e.g., scanning mirror 403 in FIG. 4) rotating around a rotation axis to scan a range of vertical viewing angles (e.g., angle δ1 in FIG. 6). For example, the scanning mirror may be controller by a controller (e.g., controller 320 in FIG. 3) to rotate.

In step S704, the emitted optical beam may be steered by the scanner to form an outgoing beam towards an object. For example, scanning mirror 403 of scanner 410 may steer incident laser beam 407 to form outgoing laser beam 409 towards object 420 in FIG. 4. Consistent with some embodiments, scanning mirror 403 may be configured to rotate around the rotation axis and steer incidents optical beams received at different time to scan the FOV. For example, outgoing optical beams (e.g., laser beams 609 and 619 in FIG. 6) of the scanner may transmit along a plurality of vertical viewing angles within the FOV (e.g., angle δ1 in FIG. 6) to scan an object (e.g., object 612 in FIG. 6).

In step S706, the outgoing optical beam may be transmitted to scan the object. For example, laser beam 409 is transmitted to scan object 420 as shown in FIG. 4. The object may backscatter the outgoing optical beam into a returned optical beam towards a wedge prism of the scanning system. For example, object 420 receives outgoing laser beam 409 and returns laser beam 411 towards wedge prism 418 of scanning system 400. Returned laser beam 411 may be parallel to but in an opposite different from outgoing laser beam 409 as shown in FIG. 4. The wedge prism may be configured to refract the returned optical beam to form a refracted optical beam towards the scanner. For example, wedge prism 418 steers laser beam 411 to form laser beam 413 towards scanner 410 as shown in FIG. 4. Consistent with the present disclosure, laser beam 413 is in a direction different than that of laser beam 411.

In step S708, the refracted optical beam is steered by the scanner to form a receiving optical beam to a receiver. For example, refracted laser beam 413 is reflected by scanning mirror 403 of scanner 410 to form laser beam 415 towards receiver 304 as shown in FIG. 4. Consistent with the present disclosure, laser beam 415 is in a direction different than that of emitted laser beam 409 as shown in FIG. 4. In other words, laser emitter 308 is not in the light path of laser beam 405.

In step S710, the receiving optical beam formed by the scanner is detected by the receiver. For example, as shown in FIG. 4, scanning mirror 403 of scanner 410 emits laser beam 415 towards receiver 304. Consistent with the present disclosure, because laser beam 415 is non-parallel to laser beam 409, receiver 304 may receive laser beam 415 without using beam splitter 103 as shown in FIG. 1. As a result, receiver 304 may collect substantially 100% of energy of laser beam 415 in FIG. 4 and energy loss due to the use of a beam splitter can be minimized.

Although the disclosure is made using a LiDAR system as an example, the disclosed embodiments may be adapted and implemented to other types of optical sensing systems that use receivers to receive optical signals not limited to laser beams. For example, the embodiments may be readily adapted for optical imaging systems or radar detection systems that use electromagnetic waves to scan objects.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A scanning system for an optical sensing system, comprising:
   a scanner configured to steer an emitted optical beam towards an object; and
   a wedge prism configured to receive an optical beam returned from the object and refract the returned optical beam towards the scanner,
   wherein the scanner is further configured to steer the refracted optical beam to form a receiving optical beam a direction non-parallel to the emitted optical beam.

2. The scanning system of claim 1, wherein the emitted optical beam is emitted by an emitter of the optical sensing system, wherein the emitter is not in a light path of the receiving optical beam.

3. The scanning system of claim 1, wherein the returned optical beam is parallel to an outgoing optical beam formed by steering the emitted optical beam toward the object.

4. The scanning system of claim 1, wherein a refraction angle between lights in the returned optical beam from the object and lights in the refracted optical beam by the wedge prism is substantially constant.

5. The scanning system of claim 1, wherein
   the scanner is configured to steer a plurality of emitted optical beams in different directions towards the object;
   the wedge prism is configured to receive optical beams returned from the object and refract the returned optical beams towards the scanner; and
   the scanner is further configured to steer the refracted optical beams to a receiver at a fixed location.

6. The scanning system of claim 5, wherein the scanner steers substantially 100% of energy of the returned optical beam to the receiver.

7. The scanning system of claim 1, wherein the scanner is further configured to rotate around a rotation axis to steer optical beams emitted by the emitter at a plurality of scanning angles, wherein a range of the scanning angles is less than 30 degrees.

8. The scanning system of claim 1, wherein a first refraction angle of the returned optical beam at a first vertical viewing angle is different from a second refraction angle of the returned optical beam at a second vertical viewing angle.

9. The scanning system of claim 1, wherein the optical sensing system is a Light Detection and Ranging (LiDAR) system.

10. A scanning method for an optical sensing system, comprising:
   steering an emitted optical beam, by a scanner, towards an object;
   receiving an optical beam returned from the object and refracting the returned optical beam towards the scanner by a wedge prism;
   steering the refracted optical beam, by the scanner, to form a receiving optical beam in a direction non-parallel to the emitted optical beam; and
   detecting the receiving optical beam by a receiver.

11. The scanning method of claim 10, wherein the emitted optical beam is emitted by an emitter of the optical sensing system, wherein the emitter is not in a light path of the receiving optical beam.

12. The scanning method of claim 10, wherein the returned optical beam is parallel to an outgoing optical beam formed by steering the emitted optical beam toward the object.

13. The scanning method of claim 10, wherein a refraction angle between lights in the returned optical beam from the object and lights in the refracted optical beam by the wedge prism is substantially constant.

14. The scanning method of claim 10, further comprising:
   steering a plurality of emitted optical beams at different directions toward the object;
   receiving a plurality of optical beams returned from the object and refracting the returned optical beams towards the scanner by the wedge prism; and
   steering the refracted optical beams to the receiver at a fixed location.

15. The scanning method of claim 14, wherein the scanner steers substantially 100% of energy of the returned optical beam to the receiver.

16. The scanning method of claim 10, further comprising rotating around a rotation axis, by the scanner, to steer optical beams emitted by the emitter at a plurality of scanning angles, wherein a range of the scanning angles is less than 30 degrees.

17. An optical sensing system, comprising:
   an emitter configured to emit an optical beam;
   a scanning system, comprising:
      a scanner configured to steer the emitted optical beam towards an object; and
      a wedge prism configured to receive an optical beam returned from the object and refract the returned optical beam towards the scanner,
      wherein the scanner is further configured to steer the refracted optical beam to form a receiving optical beam in a direction non-parallel to the emitted optical beam; and
   a receiver configured to detect the receiving optical beam steered by the scanner.

18. The optical sensing system of claim 17, wherein the emitter is not in a light path of the receiving optical beam.

19. The optical sensing system of claim 17, wherein the returned optical beam is parallel to an outgoing optical beam formed by steering the emitted optical beam towards the object.

20. The optical sensing system of claim 17, wherein the scanner is further configured to rotate around a rotation axis to steer optical beams emitted by the emitter at a plurality of scanning angles, wherein a range of the scanning angles is less than 30 degrees.

* * * * *